United States Patent Office 2,715,562
Patented Aug. 16, 1955

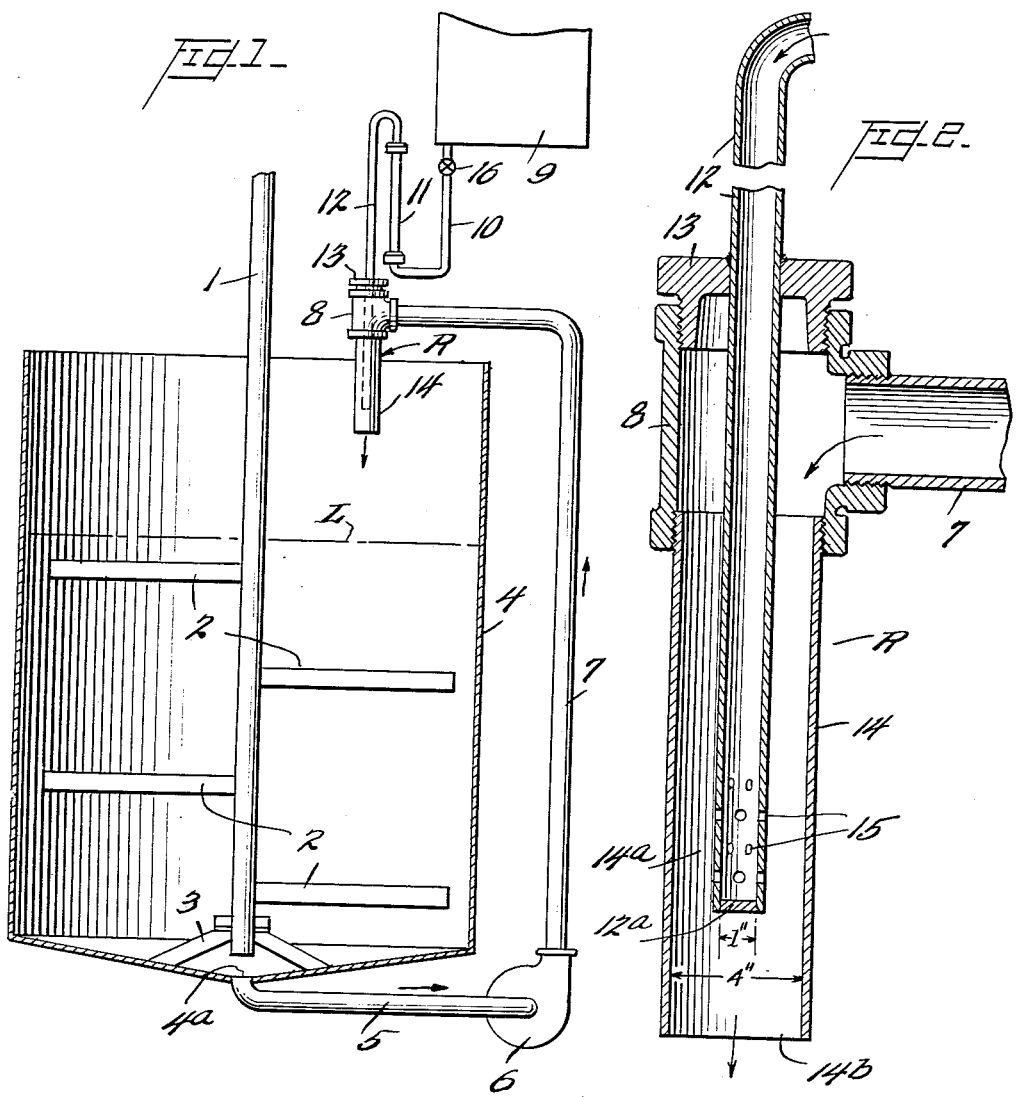

2,715,562

INSECTICIDAL CALCIUM ARSENATE AND METHOD OF MAKING SAME

John F. Les Veaux, Middleport, N. Y., assignor to Food Machinery and Chemical Corporation, San Jose, Calif.

Application October 10, 1950, Serial No. 189,317

4 Claims. (Cl. 23—53)

This invention relates to an improved insecticidal calcium arsenate composition and methods of making the same. This application is a continuation in part of Serial No. 583,773 filed March 20, 1945, now abandoned.

Among the principal objects of my invention are the provision of an insecticidal basic calcium arsenate, for the control of insect pests on plants, of exceptionally high bulk, superior adhesiveness to plant surfaces, smaller average particle size, greater safety to foliage, greater toxicity to insect pests at the time of application, more uniform composition and greater stability during normal handling, storage and use.

Another object of the present invention is the provision of an insecticidal calcium arsenate having a total combined arsenic content substantially greater than 42% up to about 50% expressed as $As_2O_5$ which remains substantially constant after repeated washings with water and which therefore possesses greater and more persistent and constant toxicity toward insect pests in actual use.

So far as I am aware all of the insecticidal basic calcium arsenates heretofore known in the art are made by adding arsenic acid slowly to an agitated suspension of calcium hydroxide (containing about one pound of CaO or 1.32 lbs. $Ca(OH)_2$ per gallon) until a sample of the sludge assays about 42% $As_2O_5$. The addition of 75% arsenic acid to a suspension containing 4000 lbs. of CaO (which makes a batch of calcium arsenate containing about 8000 lbs. calcium arsenate assaying 42% $As_2O_5$) requires about 75 minutes.

The product made by this prior art method has an apparent bulk of from 70 to 90 cubic inches per pound, is difficult to grind to uniform fineness, is largely washed off the surface of foliage during a rain, is safe to use only on the more arsenic tolerant plants such as cotton and potatoes and is unsafe to use on cucurbits, apples, stone fruits, etc. Furthermore, the phytocidal and insecticidal properties increase by several hundred percent during storage and during the weathering period after application due to the inherent instability of the product which in turn is due to the heterogeneous nature of the chemicals making up the calcium arsenate.

By my process, described hereinafter, there can be obtained a class or type of calcium arsenates having a bulk in excess of 100 cubic inches per pound of which all varieties stick with extreme tenacity to foliage even during rain storms, other varieties of which are quite safe on cucurbits and other arsenic-sensitive foliage and all varieties of which are invariably extremely stable under normal conditions of storage and weathering on plant surfaces due to the homogeneous nature of the product. By suitably varying the proportions of reactants, it is easily possible to get the maximum insecticidal value with the necessarily fixed phytocidal value which can be safely tolerated on any given species of plant. Also these optimum values or properties will remain substantially constant during the entire period of storage and use.

A further advantage of the calcium arsenate produced by this process is the extremely fine particle size of the crystals which average between one-half and one micron in diameter with none above 325 mesh (whereas every sample of prior art calcium arsenate heretofore examined by me has shown from seven to thirty percent of the particles by weight retained on the 325 mesh screen). In actual tests in the field this has shown a saving of about twenty five percent by weight per acre to obtain the same appearance of good coverage as ordinarily obtained with calcium arsenates heretofore available.

Another very important advantage of the calcium arsenates produced by the process of the present invention is their remarkably effective control of aphids on cotton plants resulting in a very substantial reduction of the seasonal average number of aphids per leaf, the maximum average number of aphids per leaf and the average number of aphids per square inch of leaf surface as compared with that normally obtained with the calcium arsenates of the prior art which are known to generally tend to increase or build up the population of aphids on cotton plants.

Other advantages and objectives of the present invention will be apparent from the detailed description of the invention as hereinafter set forth.

The preferred improved process for making the preferred improved product of the present invention may be carried out by apparatus of different types; however, there is illustrated in the accompanying drawing an arrangement of apparatus which has proven very satisfactory.

Figure 1 is a vertical diagrammatic view of the apparatus with parts in section.

Figure 2 is an enlarged vertical sectional view taken through the reaction chamber to show detailed construction and relative dimensions.

With respect to the apparatus illustrated, 4 denotes a reservoir for receiving the main bulk of the lime suspension or slurry which is also provided with a stirring device here shown as comprising a shaft 1 journalled in a bearing 3 in the bottom of the reservoir and extending upwardly through an opening in the reservoir where it will be connected with a suitable driving means, not shown, for rotating the shaft. The shaft is suitably provided with laterally extending, equally spaced, stirring paddles 2 arranged radially on the shaft and below the normal liquid level of the tank as indicated by the dot and dash line L. The bottom of the tank 4 is somewhat conical and is formed at its apex with an opening 4a to which is connected a pipe 5 leading to the intake side of a rotary pump 6. The outlet side of the pump 6 is connected to a pipe 7 which leads to the reaction chamber 14a which is a part of the reaction and mixing assembly R. The reaction chamber 14a discharges into the upper end of reservoir 4 above the normal level of the liquid as indicated by the dash and dot line L. Thus, it will be observed that the liquid originally placed in the tank 4 to the level L may be stirred while in the tank and continuously recirculated from the bottom of the tank by the pump 6 and discharged into the upper portion of the tank above the normal liquid level L.

The capacity of the tank up to the normal liquid level is about 4000 gallons.

An acid tank 9 is connected with the reaction and mixing chamber R so as to feed the acid by gravity thereinto. This connection may be of any suitable kind or type but is here shown as comprising a pipe 10 leading from the bottom of the acid tank 9 and connected to a pipe 12 through a flow metering device 11 of the rotameter type well known in the art and available on the market. Pipe 10 is also provided with a regulating and shut-off valve 16 for regulating or shutting off the flow of acid from the acid tank 9.

The reaction and mixing assembly R comprises a T-type pipe fitting 8, into the intermediate opening of which is threaded the discharge end of pipe 7. Into one of the other two openings of the T is fitted a pipe 14 and the pipe 14 is so arranged that its other end 14b discharges into the reservoir 4 above the normal liquid level L. The other or third opening of the T fitting 8 is closed by reducing bushing 13 having an opening therein into which the lead pipe 12 extends and projects through pipe 14 to a point near its discharge end 14b. It is preferred that the pipes 12 and 14 be concentrically disposed and that their dimensions be substantially as shown in Figure 2 and that the dimensions as shown in Figure 2 of the various other parts 8, 13, 12 and 14 of the reaction and mixing assembly R be substantially adhered to although the dimensions of the various parts may vary so long as the volume or capacity of the reaction chamber 14a is relatively small as compared with the volume of the recirculated liquid maintained in the tank 4.

The lower end of the pipe 12 is closed as at 12a and above this closed end are a plurality of spaced openings 15 extending radially through the pipe wall and circumferentially arranged with respect to the axis of the pipe. It is preferred to have these openings disposed in a number of, here shown as four, circumferential rings of four equally spaced holes each in each ring, the holes of adjacent rings being staggered with respect to each other. Assuming that the reaction chamber from the lower end 14b of the pipe 14 to the inner top wall of the cap 13 is 22½ inches and that the interior diameter of the pipe 4 is four inches and that the pipe 12 is an inch and one-quarter external diameter, it is preferred that the openings 15 be of approximately 3/16 inch in diameter and that these rings of openings be spaced approximately one inch from each other and that the lower ring be approximately one inch from the bottom closed wall 12a of the pipe 12. One of the important features of the present invention is the control of the relative rate of flow of the acid through the openings 15 with respect to the rate of flow of the slurry through the reaction chamber 14a.

With the apparatus as described above the process of the present invention may be carried out as follows:

*Example I*

Referring to the drawing, reservoir 4 is charged with 4000 lbs. of quick lime (CaO slaked in 4000 gallons of hot water at a temperature of about 75° C.) which fills it to the starting liquid level L. The agitator 1 in the reservoir is started and the pump 6 is also started, thus pumping and recirculating the hydrated lime slurry from the reservoir and through the reaction chamber 14a at the rate of about 500 gallons per minute.

Arsenic acid of specific gravity of 1.85 (containing 60% $As_2O_5$) contained in the measuring tank 9 is run through the flow meter of the rotameter type 11 by opening valve 16 sufficiently to allow the arsenic acid to flow through the meter at a rate of about 0.4 gallon per minute (which rate is plainly indicated on the previously calibrated rotameter).

The addition of the arsenic acid is continued at substantially this constant rate with continuous recirculation of the slurry until a dried representative sample of the resultant suspension in the reservoir shows a pH of not less than about 7.5 and not more than about 12 when determined by means of the glass electrode pH meter in an intimate mixture of 20 grams of the dried sample and 40 grams of water after being held at a temperature of about 22° C. for 1 hour, with continuous stirring, and then discontinuing the process.

Before taking the representative sample of the suspension in the reservoir for the purpose of the pH determination just described it is advisable to shut off the flow of acid from the acid tank until the pH determination is completed. Usually two or three such determinations will be required just before the end of the process before the correct pH value is obtained. If it should happen that the pH value first obtained is outside the range specified relatively small additions of arsenic acid or lime may be made to the slurry in the reservoir in order to adjust the pH value within the specified range or to any preferred value within that range.

After the pH value of the suspension has been reached the suspension is dried, pulverized and is then ready for use, either alone or in admixture with other common insecticidal dust or spray ingredients.

*Example II*

The procedure is the same as in Example I except as to the method of determining the point at which to stop the flow of the arsenic acid into the lime slurry which in the present example is carried out as follows:

The rate of flow of both the streams of arsenic acid and the lime slurry into the reaction chamber are each maintained at a different and predetermined substantially constant rate such that the rate of flow of the arsenic acid is sufficiently low relative to that of the lime slurry to maintain at least a slight amount of unreacted hydrated lime in the reaction chamber, 14a, throughout substantially the whole of the reaction process.

In the present example this rate of flow of the arsenic acid is about 0.4 gallon per minute and that of the lime slurry is about 500 gallons per minute.

By the foregoing procedure the hydrated lime slurry is converted to basic calcium arsenate at a substantially constant rate. This substantially constant rate of conversion of the hydrated lime slurry is determined by titration of several representative samples of the slurry containing the unreacted lime taken from the reservoir at intervals during the process after temporarily stopping the addition of the arsenic acid, using hydrochloric acid of fixed but not necessarily known strength and thymolphthalein indicator in making the titration.

From this known rate of conversion of the unreacted lime, determined in the manner just described, the total time from the beginning of the addition of the arsenic acid which is required to convert substantially all the lime to basic calcium arsenate may in turn be readily ascertained and in the present example the addition of the arsenic acid is stopped at the end of this total period of time.

A convenient method of determining this total period of time required to convert all of the lime to calcium arsenate is as follows:

The addition of arsenic acid at the constant rate to the lime slurry in the reaction chamber is started at the beginning of the reaction process and the time of starting is noted. After the lapse of about 30 minutes the addition or flow of the arsenic acid is shut off completely without interrupting the continuous recirculation of the lime slurry through the reaction chamber and the reservoir.

After allowing a few minutes for the batch to be thoroughly mixed, a representative sample of 10 cc. of the sludge is diluted with water to 200 cc. in a 600 cc. beaker and titrated with dilute HCl using thymolphthalein indicator. The strength of the hydrochloric acid is of little importance since no calculations are involved, the only requirement being that a reasonable volume be used, say from 80 to 100 cc., to titrate the first sample. The number of cubic centimeters required is plotted on cross section paper where the ordinate is graduated in cubic centimeters of hydrochloric and the abscissa is graduated in minutes of time.

The acid is then turned on at the same rate of flow and run in for a further 30 minutes, when it is again shut off, the batch stirred for a few minutes, and a second sample taken. This sample is titrated as in the case of the preceding sample and the number of cubic centimeters of hydrochloric acid again plotted on the graph. A straight line drawn through these two points and extrapolated to the abscissa will show approximately how many minutes the acid must be run in at the constant rate to convert all of the free lime to calcium arsenate. The acid is then turned on again at the same rate of flow and run for a total period of time somewhat short of the number of minutes indicated by the extrapolated points and again shut off and the batch again tested. If this point is somewhat off of the straight line previously drawn, a new straight line is drawn through the last point so as to be equidistant from the first two points and it will be found that the extrapolation of this line to the abscissa will show very accurately when all of the lime is converted to basic calcium arsenate with no substantial excess of arsenic acid (calculated to $As_2O_5$) over that corresponding to a basic calcium arsenate.

This total time for converting the lime to calcium arsenate under the conditions of the present example is usually around 140 minutes for a batch containing 4000 lbs. of quick lime.

*Example III*

This example is the same as Example I except that the end point of the reaction process is determined by continuing the addition of the arsenic acid to the lime slurry in the reaction chamber at the specified constant rate with the continuous recirculation of the lime slurry at the specified substantially constant rate until a representative dried sample of the lime slurry in the reservoir is substantially neutral toward thymolphthalein when determined or tested in an intimate mixture of 20 grams of the dried sample and 40 grams of water after being held at a temperature of about 22° C. for about 1 hour, with continuous stirring, and then discontinuing the addition of the arsenic acid.

It is to be understood that applicant's invention is not limited to the details of the above examples but that variations may be made therein without departing from the true principle or scope of the invention.

Thus, by way of illustration, the following variations may be made:

The size of the batch may be varied to suit the size of tank available.

The dilution of the lime slurry may be increased many fold but not greatly decreased due to the extremely thick sludge which results from this method of precipitation.

The temperature of the slurry may be varied from 0° C. to 212° C.

The rate of pumping of the slurry may be varied widely (although it should be smoothly continuous without fluctuation) and the total time of precipitation will vary in direct proportion to the rate of flow.

The strength of acid may be varied from very dilute to extremely concentrated.

The finished sludge may be colored by conventional methods before drying if desired.

Other mechanical quick-mixing devices may be used in place of the simple nozzle illustrated.

The rate of addition of the arsenic acid may be varied from about 0.4 gallon per minute to about 15 gallons per minute when the rate of flow of the slurry is maintained substantially constant at about 500 gallons per minute.

It has been found that within this range of variation of the rate of addition or flow of the arsenic acid, relative to the specified rate of flow of the slurry, the amount of soluble arsenic, expressed as metallic arsenic, in the finished dried product will vary from about 0.1% to about 2% in substantially direct proportion to the rate of flow of the arsenic acid when the soluble arsenic is determined (in a representative sample of the dried finished product) by titration with carbonic acid solution to substantial neutrality toward thymolphthalein indicator and subsequent extraction with water in accordance with the Geneva method for determining soluble arsenic as described on page 8 of Technical Bulletin 234, October 1935, of the New York State Agricultural Experiment Station of Geneva, New York.

Also when the rate of pumping or flow of the lime slurry is varied within the wide range indicated above, the rate of flow of the arsenic acid should be correspondingly varied to maintain the relative rates of flow of the two liquids within the range of ratios corresponding to the rates of flow of the two liquids specifically mentioned above.

As previously stated one of the most important features of the present invention is the maintenance of the relative rates of flow of the arsenic acid and lime slurry into the reaction and mixing chamber or zone at a predetermined and substantially constant value or ratio whereby an essentially basic calcium arsenate may be produced which contains a predetermined amount of soluble arsenic within the range of about 0.1% to about 2%.

It is important to note in this same connection that it is this predetermined or controlled amount of soluble arsenic which in turn, I am convinced, is one of the main factors which leads directly to some of the main advantages of the finished product of the present invention in actual use, particularly its greater and more uniform toxicity toward insect pests on plants immediately after application to the plants and without injury thereto.

All of the finished calcium arsenate products of the above examples of the method of the present invention are essentially basic calcium arsenates. That is to say the ratio of CaO to $As_2O_5$ in chemical combination with each other in these calcium arsenates is substantially higher than 3 which corresponds to the ratio of normal or tri-basic calcium arsenate ($Ca_3(AsO_4)_2$).

Likewise all of the finished calcium arsenate products of the above examples of the method of the present invention have a pH of not less than about 7.5 and not more than about 12 when determined by the glass electrode pH meter as described in Example I and elsewhere herein.

Although the exact reasons for the superior control of aphids on cotton which is obtainable by the use of the calcium arsenate of the present invention, as already explained above, is not fully understood I believe this is in some way mainly due to its pH value as compared to that of the basic calcium arsenates of the prior art all of which so far as is now known posses pH values lying outside the range of the pH values of the basic calcium arsenates of the present invention when determined in the manner hereinbefore described.

The finished insecticidal basic calcium arsenate products of the present invention are also further characterized by a total $As_2O_5$ content of about 48% to about 52% as contrasted with those of the prior art which have a total $As_2O_5$ content much lower than the above range, normally about 42%. This decidedly higher $As_2O_5$ content of the finished product of the present invention contributes very substantially to its greater and more persistent insecticidal toxicity in actual use, as already mentioned above.

The calcium arsenate of the present invention although a basic salt does not contain any considerable quantity of free lime. This is strikingly shown by the pH of a slurry of the product which possesses a pH of less than 12 and more than 7.5. With free lime in an amount sufficient to saturate such slurry, the pH would be that of lime itself, namely, 12.5. Furthermore, the soluble arsenic as determined by the Geneva method is relatively low in my improved product and does not increase upon storage or aging of the product as do the so-called calcium arsenates produced heretofore. This is shown in the following table when the physical and chemical characteristics of my product are shown compared to those of prior products.

|  | Commercial Sample Calcium Arsenate | Product of Present Invention |
| --- | --- | --- |
| Percent Free CaO | 6.64 | 0.51 |
| pH of Slurry | 12.50 | 8.5 |
| Total Arsenic as $As_2O_5$ | 42.20 | 50.37 |
| Soluble Arsenic or $As_2O_5$ (Geneva) | 2.35 | 0.41 |
| Residue on 325 Mesh Screen, percent by weight | 10 | None |

The characteristics of the calcium arsenate of the present invention are such that organic insecticides may be admixed therewith without degrading the organic insecticide or materially affecting the insecticidal activity thereof. I feel that this is probably due to the absence of any great quantity of soluble matter in the calcium arsenate of the present invention whether such soluble matter be free lime or a soluble salt of arsenic.

Typical formulations were prepared of calcium arsenate, dust and an active organic insecticide and the amount of degradation of the active organic insecticide determined at periodic intervals. The calcium arsenate employed was in the one case a commercial sample appearing upon the market and in the other case a sample of calcium arsenate prepared in accordance with my invention. The active organic insecticides were DDT, BHC and Parathion and in all cases very rapid degradation of the organic insecticide was observed when commercial calcium arsenates were admixed therewith. The analysis of the calcium arsenates was as follows:

|  | Commercial Calcium Arsenate | Product of Present Invention |
|---|---|---|
| pH of Slurry | 12.4 | 8.1 |
| Free lime, percent | 6.69 | 0.0 |
| Total Arsenic as $As_2O_5$ | 44.8 | 48.4 |
| Soluble Arsenic (Geneva) | 1.14 | 1.45 |
| Residue on 325 Mesh Screen, percent | 10 | None |

The results of the tests which were carried out at 55° C. were as follows:

| Time | Percent Degraded in— | | | |
|---|---|---|---|---|
|  | 4 Hours | 7 Days | 20 Days | 225 Days |
| DDT in Commercial Calcium Arsenate | 5.91 | 32.1 |  | 68.5 |
| DDT in Product of Present Invention | 0.0 | 2.3 |  | 16.5 |
| BHC in Commercial Calcium Arsenate | 10.5 | 29.0 | 36.8 | 55.8 |
| BHC in Product of Present Invention | 0.0 | 0.0 | 1.9 | 2.5 |

All of these data show that there is a great difference both in physical and chemical characteristics between the product of the present invention and the product heretofore produced under the name calcium arsenate. Whereas the phytotoxic activity of the product previously made increased with age and weathering, that of the product of the present invention is relatively low and remaining unchanged with aging or weather exposure.

What is claimed is:

1. In the method of making an insecticidal calcium arsenate by chemically reacting arsenic acid with an aqueous suspension of hydrated lime, the steps which comprise recirculating the suspension of hydrated lime from a reservoir containing the main bulk of the suspension through a relatively small main reaction chamber where most of the reaction occurs and back to the reservoir; gradually adding the arsenic acid to, and thoroughly mixing it with, the stream of lime suspension as it passes through the reaction chamber and continuing the aforesaid procedure until substantially all of the hydrated lime in the suspension has been converted to calcium arsenate and then discontinuing the process, the rate of addition of the arsenic acid to the hydrated lime in the reaction chamber being sufficiently low to maintain an excess of unreacted hydrated lime in the reaction chamber throughout substantially the whole of the process, until the conversion of the lime to calcium arsenate is completed; the suspension of hydrated lime in circulation during the reaction and until the reaction is completed containing both the reaction product of the reactants and the excess lime.

2. In the method of making an insecticidal calcium arsenate by chemically reacting arsenic acid with an aqueous suspension of hydrated lime, the steps which comprise recirculating the suspension of hydrated lime from a reservoir containing the main bulk of the suspension through a relatively small main reaction chamber where most of the reaction occurs and back to the reservoir; gradually adding the arsenic acid to, and thoroughly mixing it with, the stream of lime suspension as it passes through the reaction chamber and continuing the aforesaid procedure until a representative sample of the resultant suspension in the reservoir shows a substantially neutral reaction toward thymolphthalein indicator and then discontinuing the process, the rate of addition of the arsenic acid to the hydrated lime in the reaction chamber being sufficiently low to maintain an excess of unreacted hydrated lime in the reaction chamber throughout substantially the whole of the process, until the said neutral point is reached; the suspension of hydrated lime in circulation during the reaction and until the reaction is completed containing both the reaction product of the reactants and the excess lime.

3. In the method of making an insecticidal calcium arsenate by chemically reacting arsenic acid with an aqueous suspension of hydrated lime, the steps which comprise recirculating the suspension of hydrated lime from a reservoir containing the main bulk of the suspension through a relatively small main reaction chamber where most of the reaction occurs and back to the reservoir; gradually adding the arsenic acid at a measured substantially constant rate to the stream of lime suspension as it passes through the reaction chamber while simultaneously mixing it with the lime suspension in the reaction chamber, whereby the lime is converted to calcium arsenate at a substantially constant average rate; determining this substantially constant average rate of conversion of the lime by titration of the unreacted lime in several representative samples taken from the reservoir at intervals during the process after temporarily stopping the addition of the arsenic acid; and from this rate determining the total time from the beginning of the addition of the arsenic acid required to convert all of the lime to calcium arsenate; and finally discontinuing the addition of the arsenic acid at the end of the said total time, the rate of addition of the arsenic acid to the hydrated lime in the reaction chamber being sufficiently low to maintain an excess of unreacted hydrated lime in the reaction chamber throughout substantially the whole of the process, until the said total time has expired; the suspension of hydrated lime in circulation during the reaction and until the reaction is completed containing both the reaction product of the reactants and the excess lime.

4. In the method of making an insecticidal calcium arsenate by chemically reacting arsenic acid with an aqueous suspension of hydrated lime, the steps which comprise recirculating the suspension of hydrated lime from a reservoir containing the main bulk of the suspension through a relatively small main reaction chamber where most of the reaction occurs and back to the reservoir; gradually adding the arsenic acid to, and thoroughly mixing it with, the stream of lime suspension as it passes through the reaction chamber and continuing the aforesaid procedure until a dried representative sample of the resultant suspension in the reservoir shows a pH of not less than about 7.5 and not more than about 12 as determined by means of the glass electrode pH meter in an intimate mixture of 20 grams of the dried sample and 40 grams of water after being held at a temperature of about 22° C. for 1 hour, with continuous stirring, and then discontinuing the process, the rate of addition of the arsenic acid to the hydrated lime in the reaction chamber being sufficiently low to maintain an excess of unreacted hydrated lime in the reaction chamber throughout substantially the whole of the process, until the reaction product acquires the said pH value; the suspension of hydrated lime in circulation during the reaction and until the reaction is completed containing both the reaction product of the reactants and the excess lime.

References Cited in the file of this patent

UNITED STATES PATENTS

| | | |
|---|---|---|
| 1,434,650 | Dickey | Nov. 7, 1922 |
| 1,475,545 | Drefahl | Nov. 27, 1923 |
| 1,578,150 | Lopez | Mar. 23, 1926 |
| 2,122,861 | Hemminger | July 5, 1938 |
| 2,123,192 | Les Veaux | July 12, 1938 |
| 2,166,246 | Haag | July 18, 1939 |

OTHER REFERENCES

De Ong: "Chemistry and Uses of Insecticides," pages 13–17, Reinhold Publishing Corp., New York, 1948.

Mellor: "A Comprehensive Treatise on Inorganic and Theoretical Chemistry," vol. 9, pages 169–170. Longmans, Green and Co., New York, 1929.